United States Patent
Gupta et al.

(10) Patent No.: US 9,903,316 B2
(45) Date of Patent: Feb. 27, 2018

(54) STOICHIOMETRIC COMBUSTION OF ENRICHED AIR WITH EXHAUST GAS RECIRCULATION

(75) Inventors: Himanshu Gupta, Lorton, VA (US); Richard Huntington, Houston, TX (US); Moses K. Minta, Missouri City, TX (US); Franklin F. Mittricker, Jamul, CA (US); Loren K. Starcher, Sugar Land, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 403 days.

(21) Appl. No.: 13/702,540

(22) PCT Filed: Jun. 9, 2011

(86) PCT No.: PCT/US2011/039829
§ 371 (c)(1),
(2), (4) Date: Dec. 6, 2012

(87) PCT Pub. No.: WO2012/003079
PCT Pub. Date: Jan. 5, 2012

(65) Prior Publication Data
US 2013/0091854 A1  Apr. 18, 2013

Related U.S. Application Data

(60) Provisional application No. 61/361,178, filed on Jul. 2, 2010.

(51) Int. Cl.
*F02C 3/34* (2006.01)
*F02C 6/18* (2006.01)
(Continued)

(52) U.S. Cl.
CPC ............ *F02M 25/07* (2013.01); *F02B 47/10* (2013.01); *F02C 1/007* (2013.01); *F02C 3/34* (2013.01);
(Continued)

(58) Field of Classification Search
CPC ......... F02M 25/07; F02B 47/10; F02C 1/007; F02C 6/18; F02C 3/34; Y02E 20/12; Y02E 20/16
(Continued)

(56) References Cited

U.S. PATENT DOCUMENTS 2,488,911 A    11/1949   Hepburn et al.
2,884,758 A     5/1959   Oberle
(Continued)

FOREIGN PATENT DOCUMENTS

CA    2231749    3/1998    ............... F23C 9/00
CA    2550675    7/2005    ............... F02C 3/34
(Continued)

OTHER PUBLICATIONS

Air Separation Technology Ion Transport Membrane—Air Products 2008.
(Continued)

*Primary Examiner* — Lorne Meade
*Assistant Examiner* — Eric Linderman
(74) *Attorney, Agent, or Firm* — ExxonMobil Upstream Research Company Law Department

(57) ABSTRACT

Methods and systems for low emission power generation in hydrocarbon recovery processes are provided. One system includes a gas turbine system configured to stoichiometrically combust a compressed oxidant derived from enriched air and a fuel in the presence of a compressed recycle exhaust gas and expand the discharge in an expander to generate a recycle exhaust stream and drive a main com-
(Continued)

pressor. A boost compressor receives and increases the pressure of the recycle exhaust stream and prior to being compressed in a compressor configured to generate the compressed recycle exhaust gas. To promote the stoichiometric combustion of the fuel and increase the $CO_2$ content in the recycle exhaust gas, the enriched air can have an increased oxygen concentration.

14 Claims, 3 Drawing Sheets

(51) Int. Cl.
    F02M 25/07    (2006.01)
    F02C 1/00     (2006.01)
    F02B 47/10    (2006.01)
    F02M 26/00    (2016.01)
(52) U.S. Cl.
    CPC ............ F02C 6/18 (2013.01); F02M 26/00 (2016.02); Y02E 20/12 (2013.01); Y02E 20/16 (2013.01); Y02E 20/18 (2013.01); Y02T 10/121 (2013.01)
(58) Field of Classification Search
    USPC .................. 60/39.5, 39.52, 39.182
    See application file for complete search history.

(56)             References Cited

U.S. PATENT DOCUMENTS

| | | |
|---|---|---|
| 3,561,895 A | 2/1971 | Michelson |
| 3,631,672 A | 1/1972 | Gentile et al. |
| 3,643,430 A | 2/1972 | Emory et al. |
| 3,705,492 A | 12/1972 | Vickers ............ 60/39.51 |
| 3,841,382 A | 10/1974 | Gravis, III et al. ......... 159/16 R |
| 3,949,548 A | 4/1976 | Lockwood, Jr. |
| 4,018,046 A | 4/1977 | Hurley |
| 4,033,712 A * | 7/1977 | Morton ............ F23N 1/022 123/676 |
| 4,043,395 A | 8/1977 | Every et al. ............ 166/263 |
| 4,050,239 A | 9/1977 | Kappler et al. ............ 60/39.51 |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. ............ 431/9 |
| 4,165,609 A | 8/1979 | Rudolph |
| 4,171,349 A | 10/1979 | Cucuiat et al. ............ 423/574 |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest ............ 60/39.18 |
| 4,344,486 A | 8/1982 | Parrish ............ 166/272 |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman ............ 435/262 |
| 4,434,613 A | 3/1984 | Stahl ............ 60/39.7 |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby ............ 60/39.52 |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. ............ 62/24 |
| 4,762,543 A | 8/1988 | Pantermuehl et al. ............ 62/28 |
| 4,817,387 A | 4/1989 | Lashbrook |
| 4,858,428 A | 8/1989 | Paul ............ 60/39.17 |
| 4,895,710 A | 1/1990 | Hartmann et al. ............ 423/351 |
| 4,898,001 A | 2/1990 | Kuroda et al. |
| 4,946,597 A | 8/1990 | Sury |
| 4,976,100 A | 12/1990 | Lee ............ 60/39.02 |
| 5,014,785 A | 5/1991 | Puri et al. ............ 166/263 |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. ............ 166/252 |
| 5,098,282 A | 3/1992 | Schwartz et al. |
| 5,123,248 A | 6/1992 | Monty et al. ............ 60/740 |
| 5,135,387 A | 8/1992 | Martin et al. |
| 5,141,049 A | 8/1992 | Larsen et al. ............ 165/133 |
| 5,142,866 A | 9/1992 | Yanagihara et al. |
| 5,147,111 A | 9/1992 | Montgomery ............ 299/16 |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. ............ 166/268 |
| 5,344,307 A | 9/1994 | Schwartz et al. |
| 5,345,756 A | 9/1994 | Jahnke et al. ............ 60/39.02 |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. ............ 60/39.02 |
| 5,402,847 A | 4/1995 | Wilson et al. ............ 166/263 |
| 5,444,971 A | 8/1995 | Holenbrger ............ 60/39.02 |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. ............ 60/39.23 |
| 5,542,840 A | 8/1996 | Surbey et al. |
| 5,566,756 A | 10/1996 | Chaback et al. ............ 166/263 |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,599,179 A * | 2/1997 | Lindner ............ F23N 1/02 431/12 |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,624 A * | 8/1997 | Kang et al. ............ 60/783 |
| 5,657,631 A | 8/1997 | Androsov |
| 5,685,158 A | 11/1997 | Lenahan et al. |
| 5,689,948 A * | 11/1997 | Frutschi ............ F01K 21/042 60/39.17 |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. ............ 60/39.02 |
| 5,725,054 A | 3/1998 | Shayegi et al. ............ 166/263 |
| 5,740,786 A | 4/1998 | Gartner |

(56) References Cited

U.S. PATENT DOCUMENTS

| | | |
|---|---|---|
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. ............. 60/39.02 |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. ........ 208/390 |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. ........ 60/39.23 |
| 6,089,855 A | 7/2000 | Becker et al. .................... 431/9 |
| 6,094,916 A | 8/2000 | Puri et al. |
| 6,101,983 A | 8/2000 | Anand et al. |
| 6,148,602 A | 11/2000 | Demetri ..................... 60/39.05 |
| 6,183,241 B1 | 2/2001 | Bohn et al. |
| 6,201,029 B1 | 3/2001 | Waycuilis .................... 518/703 |
| 6,202,400 B1 | 3/2001 | Utamura et al. ............ 60/39.03 |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon ............................. 60/649 |
| 6,263,659 B1 | 7/2001 | Dillon ........................... 60/39.02 |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. ..................... 60/649 |
| 6,283,087 B1 | 9/2001 | Isaksen |
| 6,289,677 B1 | 9/2001 | Prociw et al. |
| 6,298,652 B1 | 10/2001 | Mittricker et al. ......... 60/39.02 |
| 6,298,654 B1 | 10/2001 | Vermes et al. ............. 60/39.02 |
| 6,298,664 B1 | 10/2001 | Asen et al. .................... 60/649 |
| 6,299,433 B1 * | 10/2001 | Gauba ..................... F23N 5/022 431/12 |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. ................. 60/39.06 |
| 6,345,493 B1 | 2/2002 | Smith et al. ................. 60/39.02 |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. ................... 60/39.37 |
| 6,383,461 B1 | 5/2002 | Lang |
| 6,389,796 B1 * | 5/2002 | Mandai ................. F01K 21/047 60/39.182 |
| 6,389,814 B2 | 5/2002 | Viteri et al. ..................... 60/716 |
| 6,405,536 B1 | 6/2002 | Ho et al. ......................... 60/742 |
| 6,412,278 B1 | 7/2002 | Matthews |
| 6,412,302 B1 | 7/2002 | Foglietta |
| 6,412,559 B1 | 7/2002 | Gunter et al. .................. 166/271 |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones .................... 166/250.01 |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. .................... 62/617 |
| 6,484,503 B1 | 11/2002 | Raz |
| 6,484,507 B1 | 11/2002 | Pradt |
| 6,487,863 B1 | 12/2002 | Chen et al. |
| 6,490,858 B2 | 12/2002 | Barrett et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,508,209 B1 | 1/2003 | Collier ............................. 123/3 |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 * | 7/2003 | Kataoka .................. F02C 3/305 60/39.3 |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,637,183 B2 | 10/2003 | Viteri et al. ................. 60/39.182 |
| 6,644,041 B1 | 11/2003 | Eyermann |
| 6,655,150 B1 | 12/2003 | Asen et al. ..................... 60/772 |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. ..................... 431/11 |
| 6,722,436 B2 | 4/2004 | Krill .............................. 166/303 |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. ..................... 60/775 |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. ..................... 431/8 |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. ............. 60/772 |
| 6,910,335 B2 | 6/2005 | Viteri et al. ..................... 60/786 |
| 6,923,915 B2 | 8/2005 | Alford et al. |
| 6,945,029 B2 | 9/2005 | Viteri ........................... 60/39.17 |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |

(56) References Cited

U.S. PATENT DOCUMENTS

| | | | |
|---|---|---|---|
| 6,969,123 B2 | 11/2005 | Vinegar et al. | |
| 6,971,242 B2 | 12/2005 | Boardman | |
| 6,981,358 B2 | 1/2006 | Bellucci et al. | |
| 6,988,549 B1 | 1/2006 | Babcock | |
| 6,993,901 B2 | 2/2006 | Shirakawa | |
| 6,993,916 B2 | 2/2006 | Johnson et al. | |
| 6,994,491 B2 | 2/2006 | Kittle | |
| 7,010,921 B2 | 3/2006 | Intile et al. | |
| 7,011,154 B2 | 3/2006 | Maher et al. | |
| 7,015,271 B2 | 3/2006 | Bice et al. | |
| 7,032,388 B2 | 4/2006 | Healy | |
| 7,040,400 B2 | 5/2006 | de Rouffignac et al. | |
| 7,043,898 B2 | 5/2006 | Rago | |
| 7,043,920 B2 | 5/2006 | Viteri et al. | 60/716 |
| 7,056,482 B2 | 6/2006 | Hakka et al. | |
| 7,059,152 B2 | 6/2006 | Oakey et al. | |
| 7,065,953 B1 | 6/2006 | Kopko | 60/39.3 |
| 7,065,972 B2 | 6/2006 | Zupanc et al. | |
| 7,074,033 B2 | 7/2006 | Neary | |
| 7,077,199 B2 | 7/2006 | Vinegar et al. | |
| 7,089,743 B2 | 8/2006 | Frutschi et al. | 60/772 |
| 7,096,942 B1 | 8/2006 | de Rouffignac et al. | |
| 7,097,925 B2 | 8/2006 | Keefer | |
| 7,104,319 B2 | 9/2006 | Vinegar et al. | |
| 7,104,784 B1 | 9/2006 | Hasegawa et al. | |
| 7,124,589 B2 | 10/2006 | Neary | 60/784 |
| 7,137,256 B1 | 11/2006 | Stuttaford et al. | |
| 7,137,623 B2 | 11/2006 | Mockry et al. | |
| 7,143,572 B2 | 12/2006 | Ooka et al. | 60/39.182 |
| 7,143,606 B2 | 12/2006 | Tranier | |
| 7,146,969 B2 | 12/2006 | Weirich | |
| 7,147,461 B2 | 12/2006 | Neary | 431/5 |
| 7,162,875 B2 | 1/2007 | Fletcher et al. | |
| 7,168,265 B2 | 1/2007 | Briscoe et al. | |
| 7,168,488 B2 | 1/2007 | Olsvik et al. | |
| 7,185,497 B2 | 3/2007 | Dudebout et al. | |
| 7,194,869 B2 | 3/2007 | McQuiggan et al. | |
| 7,197,880 B2 | 4/2007 | Thornton et al. | |
| 7,225,623 B2 | 6/2007 | Koshoffer | |
| 7,237,385 B2 | 7/2007 | Carrea | |
| 7,284,362 B2 | 10/2007 | Marin et al. | 60/39.182 |
| 7,299,619 B2 | 11/2007 | Briesch et al. | |
| 7,302,801 B2 | 12/2007 | Chen | |
| 7,305,817 B2 | 12/2007 | Blodgett et al. | |
| 7,305,831 B2 | 12/2007 | Carrea et al. | 60/772 |
| 7,313,916 B2 | 1/2008 | Pellizzari | |
| 7,318,317 B2 | 1/2008 | Carrea | |
| 7,343,742 B2 | 3/2008 | Wimmer et al. | |
| 7,353,655 B2 | 4/2008 | Bolis et al. | |
| 7,357,857 B2 | 4/2008 | Hart et al. | 208/391 |
| 7,363,756 B2 | 4/2008 | Carrea et al. | 60/39.52 |
| 7,363,764 B2 | 4/2008 | Griffin et al. | |
| 7,381,393 B2 | 6/2008 | Lynn | |
| 7,401,577 B2 | 7/2008 | Saucedo et al. | 122/448.1 |
| 7,410,525 B1 | 8/2008 | Liu et al. | |
| 7,416,137 B2 | 8/2008 | Hagen et al. | |
| 7,434,384 B2 | 10/2008 | Lord et al. | |
| 7,438,744 B2 | 10/2008 | Beaumont | |
| 7,467,942 B2 | 12/2008 | Carroni et al. | |
| 7,472,550 B2 | 1/2009 | Lear et al. | 62/238.3 |
| 7,481,048 B2 | 1/2009 | Harmon et al. | |
| 7,481,275 B2 | 1/2009 | Olsvik et al. | 166/303 |
| 7,482,500 B2 | 1/2009 | Johann et al. | |
| 7,485,761 B2 | 2/2009 | Schindler et al. | |
| 7,488,857 B2 | 2/2009 | Johann et al. | |
| 7,490,472 B2 * | 2/2009 | Lynghjem et al. | 60/772 |
| 7,491,250 B2 | 2/2009 | Hershkowitz et al. | 48/198.7 |
| 7,492,054 B2 | 2/2009 | Catlin | |
| 7,493,769 B2 | 2/2009 | Jangili | |
| 7,498,009 B2 | 3/2009 | Leach et al. | |
| 7,503,178 B2 | 3/2009 | Bucker et al. | 60/774 |
| 7,506,501 B2 | 3/2009 | Anderson et al. | |
| 7,513,099 B2 | 4/2009 | Nuding et al. | |
| 7,513,100 B2 | 4/2009 | Motter et al. | |
| 7,516,626 B2 | 4/2009 | Brox et al. | 62/643 |
| 7,520,134 B2 | 4/2009 | Durbin et al. | |
| 7,536,252 B1 | 5/2009 | Hibshman, II et al. | |
| 7,536,873 B2 | 5/2009 | Nohlen | 62/644 |
| 7,540,150 B2 | 6/2009 | Schmid et al. | |
| 7,559,977 B2 | 7/2009 | Fleischer et al. | 95/236 |
| 7,562,519 B1 | 7/2009 | Harris et al. | |
| 7,562,529 B2 | 7/2009 | Kuspert et al. | |
| 7,566,394 B2 | 7/2009 | Koseoglu | 208/309 |
| 7,574,856 B2 | 8/2009 | Mak | |
| 7,591,866 B2 | 9/2009 | Bose | |
| 7,594,386 B2 | 9/2009 | Narayanan et al. | |
| 7,610,759 B2 | 11/2009 | Yoshida et al. | |
| 7,611,681 B2 | 11/2009 | Kaefer | |
| 7,614,352 B2 | 11/2009 | Anthony et al. | |
| 7,618,606 B2 | 11/2009 | Fan et al. | |
| 7,631,493 B2 | 12/2009 | Shirakawa et al. | |
| 7,635,408 B2 | 12/2009 | Mak et al. | |
| 7,637,093 B2 | 12/2009 | Rao | 60/39.52 |
| 7,644,573 B2 | 1/2010 | Smith et al. | |
| 7,650,744 B2 | 1/2010 | Varatharajan et al. | 60/39.12 |
| 7,654,320 B2 | 2/2010 | Payton | 166/257 |
| 7,654,330 B2 | 2/2010 | Zubrin et al. | |
| 7,655,071 B2 | 2/2010 | De Vreede | |
| 7,670,135 B1 | 3/2010 | Zink et al. | |
| 7,674,443 B1 | 3/2010 | Davis | |
| 7,677,309 B2 | 3/2010 | Shaw et al. | |
| 7,682,597 B2 | 3/2010 | Blumenfeld et al. | |
| 7,690,204 B2 | 4/2010 | Drnevich et al. | |
| 7,695,703 B2 | 4/2010 | Sobolevskiy et al. | |
| 7,717,173 B2 | 5/2010 | Grott | |
| 7,728,736 B2 * | 6/2010 | Leeland | F23N 5/02 340/578 |
| 7,734,408 B2 | 6/2010 | Shiraki | |
| 7,749,311 B2 | 7/2010 | Saito et al. | |
| 7,752,848 B2 | 7/2010 | Chellappa et al. | 60/780 |
| 7,752,850 B2 | 7/2010 | Laster et al. | 60/794 |
| 7,753,039 B2 | 7/2010 | Harima et al. | |
| 7,762,084 B2 | 7/2010 | Martis et al. | 60/792 |
| 7,763,163 B2 | 7/2010 | Koseoglu | |
| 7,763,227 B2 | 7/2010 | Wang | |
| 7,765,810 B2 * | 8/2010 | Pfefferle | F02C 6/18 60/723 |
| 7,789,159 B1 | 9/2010 | Bader | |
| 7,789,658 B2 | 9/2010 | Towler et al. | |
| 7,789,944 B2 | 9/2010 | Saito et al. | |
| 7,793,494 B2 | 9/2010 | Wirth et al. | |
| 7,824,179 B2 | 11/2010 | Hasegawa et al. | |
| 7,827,778 B2 * | 11/2010 | Finkenrath | B01D 53/00 60/39.52 |
| 7,827,794 B1 | 11/2010 | Pronske et al. | |
| 7,841,186 B2 | 11/2010 | So et al. | |
| 7,845,406 B2 | 12/2010 | Nitschke | |
| 7,861,511 B2 | 1/2011 | Chillar et al. | |
| 7,874,350 B2 | 1/2011 | Pfefferle | |
| 7,882,692 B2 | 2/2011 | Pronske et al. | |
| 7,886,522 B2 | 2/2011 | Kammel | |
| 7,906,304 B2 | 3/2011 | Kohr | |
| 7,914,749 B2 | 3/2011 | Carstens et al. | |
| 7,918,906 B2 | 4/2011 | Zubrin et al. | |
| 7,922,871 B2 | 4/2011 | Price et al. | |
| 7,931,712 B2 | 4/2011 | Zubrin et al. | |
| 7,931,731 B2 | 4/2011 | Van Heeringen et al. | |
| 7,931,888 B2 | 4/2011 | Drnevich et al. | |
| 7,934,926 B2 | 5/2011 | Kornbluth et al. | |
| 7,942,003 B2 | 5/2011 | Baudoin et al. | |
| 7,943,097 B2 | 5/2011 | Golden et al. | |
| 7,955,403 B2 | 6/2011 | Ariyapadi et al. | |
| 7,966,822 B2 | 6/2011 | Myers et al. | |
| 7,980,312 B1 | 7/2011 | Hill et al. | |
| 7,985,399 B2 | 7/2011 | Drnevich et al. | |
| 7,988,750 B2 | 8/2011 | Lee et al. | |
| 8,001,789 B2 | 8/2011 | Vega et al. | |
| 8,029,273 B2 | 10/2011 | Paschereit et al. | |
| 8,036,813 B2 | 10/2011 | Tonetti et al. | |
| 8,038,416 B2 | 10/2011 | Ono et al. | |
| 8,046,986 B2 | 11/2011 | Chillar et al. | |
| 8,047,007 B2 | 11/2011 | Zubrin et al. | |
| 8,051,638 B2 | 11/2011 | Aljabari et al. | |
| 8,061,120 B2 | 11/2011 | Hwang | |

(56) References Cited

U.S. PATENT DOCUMENTS

| | | | |
|---|---|---|---|
| 8,062,617 B2 | 11/2011 | Stakhev et al. | |
| 8,065,870 B2 | 11/2011 | Jobson et al. | |
| 8,065,874 B2 | 11/2011 | Fong et al. | |
| 8,074,439 B2 | 12/2011 | Foret | |
| 8,080,225 B2 | 12/2011 | Dickinson et al. | |
| 8,097,230 B2 | 1/2012 | Mesters et al. | |
| 8,101,146 B2 | 1/2012 | Fedeyko et al. | |
| 8,105,559 B2 | 1/2012 | Melville et al. | |
| 8,110,012 B2 | 2/2012 | Chiu et al. | |
| 8,117,846 B2 | 2/2012 | Wilbraham | |
| 8,127,558 B2 | 3/2012 | Bland et al. | |
| 8,127,936 B2 | 3/2012 | Liu et al. | |
| 8,127,937 B2 | 3/2012 | Liu et al. | |
| 8,166,766 B2 | 5/2012 | Draper | |
| 8,191,360 B2 | 6/2012 | Fong et al. | |
| 8,191,361 B2 | 6/2012 | Fong et al. | |
| 8,196,387 B2 | 6/2012 | Shah et al. | |
| 8,196,413 B2 | 6/2012 | Mak | |
| 8,205,455 B2 | 6/2012 | Popovic | |
| 8,206,669 B2 | 6/2012 | Schaffer et al. | |
| 8,209,192 B2 | 6/2012 | Gil et al. | |
| 8,215,105 B2 | 7/2012 | Fong et al. | |
| 8,220,247 B2 | 7/2012 | Wijmans et al. | |
| 8,220,268 B2 | 7/2012 | Callas | |
| 8,225,600 B2 | 7/2012 | Theis | |
| 8,226,912 B2 | 7/2012 | Kloosterman et al. | |
| 8,240,142 B2 | 8/2012 | Fong et al. | |
| 8,240,153 B2 | 8/2012 | Childers et al. | |
| 8,245,492 B2 | 8/2012 | Draper | |
| 8,245,493 B2 | 8/2012 | Minto | |
| 8,247,462 B2 | 8/2012 | Boshoff et al. | |
| 8,257,476 B2 | 9/2012 | White et al. | |
| 8,261,823 B1 | 9/2012 | Hill et al. | |
| 8,262,343 B2 | 9/2012 | Hagen | |
| 8,266,883 B2* | 9/2012 | Dion Ouellet | F02C 7/277 60/39.182 |
| 8,266,913 B2 | 9/2012 | Snook et al. | |
| 8,268,044 B2 | 9/2012 | Wright et al. | |
| 8,281,596 B1 | 10/2012 | Rohrssen et al. | |
| 8,316,665 B2 | 11/2012 | Mak | |
| 8,337,613 B2 | 12/2012 | Zauderer | |
| 8,347,600 B2 | 1/2013 | Wichmann et al. | |
| 8,371,100 B2 | 2/2013 | Draper | |
| 8,372,251 B2 | 2/2013 | Goller et al. | |
| 8,377,184 B2 | 2/2013 | Fujikawa et al. | |
| 8,377,401 B2 | 2/2013 | Darde et al. | |
| 8,388,919 B2 | 3/2013 | Hooper et al. | |
| 8,397,482 B2 | 3/2013 | Kraemer et al. | |
| 8,398,757 B2 | 3/2013 | Iijima et al. | |
| 8,409,307 B2 | 4/2013 | Drnevich et al. | |
| 8,414,694 B2 | 4/2013 | Iijima et al. | |
| 8,424,601 B2 | 4/2013 | Betzer-Zilevitch | |
| 8,436,489 B2 | 5/2013 | Stahlkopf et al. | |
| 8,453,461 B2 | 6/2013 | Draper | |
| 8,453,462 B2 | 6/2013 | Wichmann et al. | |
| 8,454,350 B2 | 6/2013 | Berry et al. | |
| 8,475,160 B2 | 7/2013 | Campbell et al. | |
| 8,539,749 B1 | 9/2013 | Wichmann et al. | |
| 8,555,796 B2 | 10/2013 | D'Agostini | |
| 8,627,643 B2 | 1/2014 | Chillar et al. | |
| 8,793,972 B2* | 8/2014 | Brautsch | F02C 3/30 60/39.182 |
| 9,353,682 B2* | 5/2016 | Wichmann | F02C 3/34 |
| 2001/0000049 A1 | 3/2001 | Kataoka et al. | |
| 2001/0015061 A1 | 8/2001 | Viteri et al. | 60/39.161 |
| 2001/0029732 A1 | 10/2001 | Bachmann | |
| 2001/0045090 A1 | 11/2001 | Gray, Jr. | |
| 2002/0036086 A1 | 3/2002 | Minkkinen et al. | 166/266 |
| 2002/0043063 A1 | 4/2002 | Kataoka et al. | |
| 2002/0053207 A1 | 5/2002 | Finger et al. | |
| 2002/0069648 A1 | 6/2002 | Levy et al. | |
| 2002/0166323 A1 | 11/2002 | Marin et al. | 60/775 |
| 2002/0187449 A1 | 12/2002 | Doebbeling et al. | |
| 2003/0000436 A1 | 1/2003 | Vladimir | 110/347 |
| 2003/0005698 A1 | 1/2003 | Keller | |
| 2003/0056517 A1 | 3/2003 | Brushwood et al. | |
| 2003/0131582 A1 | 7/2003 | Anderson et al. | 60/39.55 |
| 2003/0134241 A1 | 7/2003 | Marin et al. | 431/9 |
| 2003/0152879 A1* | 8/2003 | Fischer | F02M 25/00 431/8 |
| 2003/0221409 A1 | 12/2003 | McGowan | 60/39.17 |
| 2003/0235529 A1 | 12/2003 | Hershkowitz et al. | 423/652 |
| 2004/0006994 A1 | 1/2004 | Walsh et al. | |
| 2004/0068981 A1 | 4/2004 | Siefker et al. | |
| 2004/0128975 A1 | 7/2004 | Viteri | 60/39.55 |
| 2004/0134197 A1 | 7/2004 | Marin et al. | 60/774 |
| 2004/0148941 A1 | 8/2004 | Wylie | 60/772 |
| 2004/0154793 A1 | 8/2004 | Zapadinski | 166/256 |
| 2004/0166034 A1 | 8/2004 | Kaefer | |
| 2004/0170558 A1 | 9/2004 | Hershkowitz | 423/652 |
| 2004/0170559 A1 | 9/2004 | Hershkowitz et al. | 423/652 |
| 2004/0175326 A1 | 9/2004 | Hershkowitz et al. | 423/652 |
| 2004/0177617 A1* | 9/2004 | Frutschi et al. | 60/772 |
| 2004/0180973 A1 | 9/2004 | Hershkowitz | 518/703 |
| 2004/0191166 A1 | 9/2004 | Hershkowitz et al. | 423/652 |
| 2004/0206091 A1 | 10/2004 | Yee et al. | 60/777 |
| 2004/0211165 A1* | 10/2004 | Hosokawa | F02C 7/057 60/39.23 |
| 2004/0219079 A1 | 11/2004 | Hagen et al. | 422/194 |
| 2004/0223408 A1 | 11/2004 | Mathys et al. | |
| 2004/0238654 A1 | 12/2004 | Hagen et al. | |
| 2004/0241505 A1 | 12/2004 | Hershkowitz et al. | 429/17 |
| 2005/0022499 A1 | 2/2005 | Belokon et al. | 60/39.511 |
| 2005/0028529 A1 | 2/2005 | Bartlett et al. | 60/772 |
| 2005/0123874 A1 | 6/2005 | Abbasi et al. | 431/351 |
| 2005/0132713 A1 | 6/2005 | Neary | 60/784 |
| 2005/0137269 A1 | 6/2005 | Hershkowitz et al. | 518/702 |
| 2005/0144961 A1 | 7/2005 | Colibaba-Evulet et al. | 60/780 |
| 2005/0154068 A1 | 7/2005 | Hershkowitz et al. | 518/703 |
| 2005/0186130 A1 | 8/2005 | Hughes et al. | 423/219 |
| 2005/0197267 A1 | 9/2005 | Zaki et al. | 510/245 |
| 2005/0201929 A1 | 9/2005 | Hershkowitz et al. | 423/652 |
| 2005/0229585 A1 | 10/2005 | Webster | |
| 2005/0236602 A1 | 10/2005 | Viteri et al. | 252/372 |
| 2006/0005542 A1 | 1/2006 | Campbell et al. | 60/723 |
| 2006/0112675 A1 | 6/2006 | Anderson et al. | |
| 2006/0112696 A1* | 6/2006 | Lynghjem | B01D 53/62 60/772 |
| 2006/0127827 A1 | 6/2006 | Yoshida et al. | 431/8 |
| 2006/0158961 A1 | 7/2006 | Ruscheweyh et al. | |
| 2006/0183009 A1 | 8/2006 | Berlowitz et al. | 429/19 |
| 2006/0188760 A1 | 8/2006 | Hershkowitz et al. | 429/17 |
| 2006/0196812 A1 | 9/2006 | Beetge et al. | 208/435 |
| 2006/0231252 A1 | 10/2006 | Shaw et al. | 166/272.3 |
| 2006/0248888 A1 | 11/2006 | Geskes | |
| 2006/0260290 A1 | 11/2006 | Rao | 60/39.53 |
| 2007/0000242 A1 | 1/2007 | Harmon et al. | |
| 2007/0006565 A1 | 1/2007 | Fleischer et al. | 60/39.5 |
| 2007/0006592 A1* | 1/2007 | Balan | F02C 3/22 60/772 |
| 2007/0034171 A1* | 2/2007 | Griffin | F01K 21/047 122/479.1 |
| 2007/0044475 A1 | 3/2007 | Leser et al. | |
| 2007/0044477 A1 | 3/2007 | Brandt et al. | 60/783 |
| 2007/0089425 A1 | 4/2007 | Motter et al. | |
| 2007/0107430 A1 | 5/2007 | Schmid et al. | |
| 2007/0125063 A1 | 6/2007 | Evulat | 60/39.15 |
| 2007/0130957 A1* | 6/2007 | Hoffmann | C01B 3/38 60/780 |
| 2007/0144747 A1 | 6/2007 | Steinberg | 166/402 |
| 2007/0144940 A1 | 6/2007 | Hershkowitz et al. | 208/107 |
| 2007/0178035 A1 | 8/2007 | White et al. | 423/248 |
| 2007/0220864 A1 | 9/2007 | Haugen | 60/286 |
| 2007/0227156 A1 | 10/2007 | Saito et al. | 60/772 |
| 2007/0231233 A1 | 10/2007 | Bose | |
| 2007/0234702 A1 | 10/2007 | Hagen et al. | |
| 2007/0237696 A1 | 10/2007 | Payton | 423/228 |
| 2007/0240425 A1 | 10/2007 | Malavasi et al. | 60/775 |
| 2007/0245736 A1 | 10/2007 | Barnicki | 60/670 |
| 2007/0249738 A1 | 10/2007 | Haynes et al. | 518/702 |
| 2007/0272201 A1 | 11/2007 | Amano et al. | 123/295 |
| 2007/0295640 A1 | 12/2007 | Tan et al. | 208/22 |
| 2008/0000229 A1 | 1/2008 | Kuspert et al. | |
| 2008/0006561 A1 | 1/2008 | Moran et al. | 208/45 |

(56) References Cited

U.S. PATENT DOCUMENTS

| | | | |
|---|---|---|---|
| 2008/0010967 A1* | 1/2008 | Griffin | B01D 53/22 60/39.182 |
| 2008/0016868 A1 | 1/2008 | Ochs et al. | 60/688 |
| 2008/0034727 A1 | 2/2008 | Sutikno | |
| 2008/0038598 A1 | 2/2008 | Berlowitz et al. | 429/17 |
| 2008/0047280 A1 | 2/2008 | Dubar | |
| 2008/0066443 A1 | 3/2008 | Frutschi et al. | 60/39.53 |
| 2008/0083226 A1 | 4/2008 | Joshi et al. | 60/772 |
| 2008/0092539 A1 | 4/2008 | Marshall et al. | 60/599 |
| 2008/0104938 A1 | 5/2008 | Finkenrath et al. | 60/39.5 |
| 2008/0104939 A1 | 5/2008 | Hoffmann et al. | 60/39.5 |
| 2008/0104958 A1* | 5/2008 | Finkenrath | B01D 53/00 60/605.2 |
| 2008/0115478 A1 | 5/2008 | Sullivan | |
| 2008/0115495 A1 | 5/2008 | Rising | 60/731 |
| 2008/0118310 A1 | 5/2008 | Graham | 405/129.95 |
| 2008/0120960 A1* | 5/2008 | Agnew | F02C 3/34 60/39.52 |
| 2008/0127632 A1 | 6/2008 | Finkenrath et al. | 60/274 |
| 2008/0141643 A1 | 6/2008 | Varatharajan et al. | 60/39.5 |
| 2008/0142409 A1 | 6/2008 | Sankaranarayanan et al. | 208/62 |
| 2008/0155984 A1 | 7/2008 | Liu et al. | 60/649 |
| 2008/0173584 A1* | 7/2008 | White | C01B 31/20 210/656 |
| 2008/0178611 A1 | 7/2008 | Ding | |
| 2008/0202123 A1 | 8/2008 | Sullivan et al. | |
| 2008/0223038 A1 | 9/2008 | Lutz et al. | |
| 2008/0250795 A1 | 10/2008 | Katdare et al. | |
| 2008/0251234 A1 | 10/2008 | Wilson et al. | |
| 2008/0275278 A1 | 11/2008 | Clark | 585/240 |
| 2008/0290719 A1 | 11/2008 | Kaminsky et al. | 299/3 |
| 2008/0302107 A1 | 12/2008 | Fan et al. | 60/783 |
| 2008/0309087 A1 | 12/2008 | Evulet et al. | 290/52 |
| 2008/0317651 A1 | 12/2008 | Hooper et al. | 423/230 |
| 2009/0000762 A1 | 1/2009 | Wilson et al. | |
| 2009/0038247 A1 | 2/2009 | Taylor et al. | 52/287.1 |
| 2009/0056342 A1 | 3/2009 | Kirzhner | |
| 2009/0064653 A1 | 3/2009 | Hagen et al. | 60/39.3 |
| 2009/0064758 A1* | 3/2009 | Walter | F02D 41/123 73/23.31 |
| 2009/0071166 A1 | 3/2009 | Hagen et al. | |
| 2009/0094984 A1* | 4/2009 | Colket | F02C 7/22 60/723 |
| 2009/0100754 A1 | 4/2009 | Gil | 48/201 |
| 2009/0107141 A1 | 4/2009 | Chillar et al. | |
| 2009/0117024 A1 | 5/2009 | Weedon et al. | 423/437.1 |
| 2009/0120087 A1 | 5/2009 | Sumser et al. | |
| 2009/0133400 A1 | 5/2009 | Callas | 60/730 |
| 2009/0145127 A1 | 6/2009 | Vollmer et al. | 60/618 |
| 2009/0157230 A1 | 6/2009 | Hibshman, II et al. | |
| 2009/0193809 A1 | 8/2009 | Schroder et al. | 60/762 |
| 2009/0194280 A1 | 8/2009 | Gil et al. | 166/267 |
| 2009/0205334 A1 | 8/2009 | Aljabari et al. | 60/605.2 |
| 2009/0218821 A1 | 9/2009 | ElKady et al. | 290/52 |
| 2009/0223227 A1 | 9/2009 | Lipinski et al. | |
| 2009/0229263 A1 | 9/2009 | Ouellet et al. | |
| 2009/0235637 A1 | 9/2009 | Foret | |
| 2009/0235671 A1 | 9/2009 | Rabovitser et al. | 60/806 |
| 2009/0241506 A1 | 10/2009 | Nilsson | 60/39.24 |
| 2009/0250264 A1 | 10/2009 | Dupriest | 175/40 |
| 2009/0255242 A1 | 10/2009 | Paterson et al. | |
| 2009/0260585 A1* | 10/2009 | Hack | F01K 7/24 122/7 R |
| 2009/0262599 A1 | 10/2009 | Kohrs et al. | |
| 2009/0284013 A1 | 11/2009 | Anand et al. | 290/52 |
| 2009/0301054 A1 | 12/2009 | Simpson et al. | 60/39.15 |
| 2009/0301099 A1 | 12/2009 | Nigro | 60/775 |
| 2010/0003123 A1 | 1/2010 | Smith | |
| 2010/0018218 A1 | 1/2010 | Riley et al. | 60/783 |
| 2010/0028142 A1 | 2/2010 | Hashimoto et al. | 415/200 |
| 2010/0058732 A1 | 3/2010 | Kaufmann et al. | |
| 2010/0064855 A1 | 3/2010 | Lanyi et al. | 75/458 |
| 2010/0077941 A1 | 4/2010 | D'Agostini | 110/188 |
| 2010/0077946 A1 | 4/2010 | D'Agostini | |
| 2010/0089066 A1* | 4/2010 | Mina | F23D 1/06 60/772 |
| 2010/0115960 A1 | 5/2010 | Brautsch et al. | 60/772 |
| 2010/0126176 A1 | 5/2010 | Kim | 60/748 |
| 2010/0126181 A1* | 5/2010 | Ranasinghe | F02C 1/08 60/782 |
| 2010/0162703 A1 | 7/2010 | Li et al. | 60/670 |
| 2010/0170251 A1* | 7/2010 | Davis, Jr. | F02C 7/228 60/740 |
| 2010/0170253 A1 | 7/2010 | Berry et al. | |
| 2010/0174466 A1* | 7/2010 | Davis, Jr. | F02C 7/22 701/100 |
| 2010/0180565 A1* | 7/2010 | Draper | F02C 1/007 60/39.52 |
| 2010/0300102 A1 | 12/2010 | Bathina et al. | |
| 2010/0310439 A1 | 12/2010 | Brok et al. | 423/222 |
| 2010/0314136 A1 | 12/2010 | Zubrin et al. | 166/402 |
| 2010/0322759 A1 | 12/2010 | Tanioka | |
| 2010/0326084 A1* | 12/2010 | Anderson | F01K 23/10 60/775 |
| 2011/0000221 A1 | 1/2011 | Minta et al. | 60/783 |
| 2011/0000671 A1 | 1/2011 | Hershkowitz et al. | |
| 2011/0023488 A1 | 2/2011 | Fong et al. | 60/659 |
| 2011/0036082 A1 | 2/2011 | Collinot | |
| 2011/0048002 A1 | 3/2011 | Taylor et al. | |
| 2011/0048010 A1 | 3/2011 | Balcezak et al. | |
| 2011/0072779 A1 | 3/2011 | ELKady et al. | |
| 2011/0088379 A1 | 4/2011 | Nanda | |
| 2011/0110759 A1 | 5/2011 | Sanchez et al. | |
| 2011/0126512 A1 | 6/2011 | Anderson | |
| 2011/0138766 A1 | 6/2011 | ELKady et al. | |
| 2011/0146991 A1* | 6/2011 | Palamara | C01B 3/384 166/303 |
| 2011/0162353 A1 | 7/2011 | Vanvolsem et al. | |
| 2011/0205837 A1 | 8/2011 | Gentgen | |
| 2011/0219777 A1 | 9/2011 | Wijmans et al. | 60/772 |
| 2011/0219778 A1* | 9/2011 | Wijmans | B01D 53/22 60/772 |
| 2011/0226010 A1 | 9/2011 | Baxter | |
| 2011/0227346 A1 | 9/2011 | Klenven | |
| 2011/0239653 A1 | 10/2011 | Valeev et al. | |
| 2011/0265447 A1 | 11/2011 | Cunningham | |
| 2011/0027018 A1 | 12/2011 | Baker et al. | 405/128.6 |
| 2011/0289899 A1* | 12/2011 | De La Cruz Garcia | F01K 17/04 60/39.182 |
| 2011/0289932 A1* | 12/2011 | Thompson | F02C 3/30 60/776 |
| 2011/0300493 A1 | 12/2011 | Mittricker et al. | |
| 2012/0023954 A1 | 2/2012 | Wichmann | |
| 2012/0023955 A1 | 2/2012 | Draper | |
| 2012/0023956 A1* | 2/2012 | Popovic | F02C 3/34 60/772 |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0085100 A1 | 4/2012 | Hughes et al. | |
| 2012/0096870 A1 | 4/2012 | Wichmann et al. | |
| 2012/0119512 A1 | 5/2012 | Draper | |
| 2012/0144837 A1 | 6/2012 | Rasmussen et al. | |
| 2012/0174596 A1* | 7/2012 | Huntington | F02C 3/20 60/780 |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1 | 10/2012 | Kraemer et al. | |
| 2012/0279230 A1* | 11/2012 | Botarelli | F02C 9/00 60/773 |
| 2013/0042624 A1* | 2/2013 | Botarelli | F02C 9/00 60/772 |
| 2013/0074512 A1* | 3/2013 | Tillery | F01D 17/141 60/773 |

(56) References Cited

U.S. PATENT DOCUMENTS

| | | | |
|---|---|---|---|
| 2013/0086916 A1* | 4/2013 | Oelfke | F02C 6/003 60/772 |
| 2013/0086917 A1 | 4/2013 | Slobodyanskiy et al. | |
| 2013/0091853 A1* | 4/2013 | Denton | F02C 1/007 60/772 |
| 2013/0091854 A1* | 4/2013 | Gupta | F02C 1/007 60/772 |
| 2013/0098054 A1* | 4/2013 | Guethe | F02C 9/263 60/773 |
| 2013/0104562 A1* | 5/2013 | Oelfke | F02C 1/007 60/773 |
| 2013/0104563 A1* | 5/2013 | Oelfke | F02C 1/007 60/773 |
| 2013/0125554 A1 | 5/2013 | Mittricker et al. | |
| 2013/0125555 A1 | 5/2013 | Mittricker et al. | |
| 2013/0219910 A1* | 8/2013 | Botarelli | F02C 9/00 60/776 |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1* | 10/2013 | Wichmann | F02C 3/34 60/772 |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2013/0333391 A1* | 12/2013 | Sundaram | F02C 3/34 60/783 |
| 2014/0000271 A1* | 1/2014 | Mittricker | F02C 3/30 60/772 |
| 2014/0000273 A1* | 1/2014 | Mittricker | F02C 3/34 60/773 |
| 2014/0007590 A1 | 1/2014 | Huntington et al. | |
| 2014/0013766 A1 | 1/2014 | Mittricker et al. | |
| 2014/0020398 A1* | 1/2014 | Mittricker | F02C 3/34 60/772 |
| 2014/0047818 A1* | 2/2014 | Oelkfe | F02C 1/08 60/274 |
| 2014/0083109 A1* | 3/2014 | Oelfke | F02C 3/34 60/772 |
| 2014/0208755 A1* | 7/2014 | Ekanayake | F15D 1/025 60/722 |
| 2014/0208764 A1* | 7/2014 | Ekanayake | F02C 9/16 60/773 |
| 2014/0230445 A1* | 8/2014 | Huntington | F01K 23/10 60/772 |
| 2014/0250908 A1* | 9/2014 | Huntington | F02C 9/00 60/776 |

FOREIGN PATENT DOCUMENTS

| | | | |
|---|---|---|---|
| CA | 2645450 | 9/2007 | C01G 1/00 |
| CA | 2614669 | 12/2008 | B03B 9/02 |
| EP | 0453059 | 6/1994 | F01K 23/06 |
| EP | 0770771 | 5/1997 | |
| EP | 0654639 | 9/1998 | F23R 3/14 |
| GB | 0776269 | 6/1957 | |
| GB | 2117053 | 2/1983 | F02C 3/22 |
| GB | 2397349 | 7/2004 | F02C 3/22 |
| WO | WO1995/021683 | 8/1995 | B01D 53/14 |
| WO | WO1997/007329 | 2/1997 | F02C 6/00 |
| WO | WO1999/006674 | 2/1999 | F01K 23/10 |
| WO | WO1999/063210 | 12/1999 | F02C 3/34 |
| WO | WO2005/064232 | 7/2005 | F23C 6/04 |
| WO | WO2006/107209 | 10/2006 | F01K 23/00 |
| WO | WO2007/068682 | 6/2007 | E21B 43/16 |
| WO | WO2008/023986 | 2/2008 | F01K 23/06 |
| WO | WO2008/074980 | 6/2008 | C01B 3/38 |
| WO | WO2008/091158 | 7/2008 | B01D 53/22 |
| WO | WO2008142009 | 11/2008 | |
| WO | WO2008/155242 | 12/2008 | F02C 3/34 |
| WO | WO2009/120779 | 10/2009 | F02B 17/00 |
| WO | WO2009/121008 | 10/2009 | B01J 15/00 |
| WO | WO2010/044958 | 4/2010 | F02C 9/00 |
| WO | WO2010/066048 | 6/2010 | F22B 1/22 |
| WO | WO2010/141777 | 12/2010 | F02C 9/00 |
| WO | WO2011003606 | 1/2011 | |
| WO | WO2011/028322 | 3/2011 | E21B 43/40 |
| WO | WO2012/003076 | 1/2012 | F02C 7/08 |
| WO | WO2012/003077 | 1/2012 | F02C 6/00 |
| WO | WO2012/003078 | 1/2012 | F02C 3/34 |
| WO | WO2012/003079 | 1/2012 | F02C 3/34 |
| WO | WO2012/003080 | 1/2012 | F02C 6/00 |
| WO | WO2012/003489 | 1/2012 | F16K 3/28 |
| WO | WO2012/018457 | 2/2012 | F02C 3/20 |
| WO | WO2012/018458 | 2/2012 | F02C 3/00 |
| WO | WO2012128928 | 9/2012 | |
| WO | WO2012128929 | 9/2012 | |
| WO | WO2012170114 | 12/2012 | |
| WO | PCT/RU2013/000162 | 2/2013 | |
| WO | PCT/US13/036020 | 4/2013 | |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

Air Separation Technology Ion Transport Membrane—Air Products 2011.
Foy, Kirsten et al. (2005) "Comparison of Ion Transport Membranes"—Fourth Annual Conference on Carbon Capture and Sequestration, DOE/NETL; May 2005, 11 pages.
Cho, J. H. et al. (2005) "Marrying LNG and Power Generation," *Energy Markets*; Oct./Nov. 2005; 10, 8; ABI/INFORM Trade & Industry, p. 28.
Ciulia, Vincent. About.com. Auto Repair. How the Engine Works. 2001-2003.
Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, Aug. 7-12, 1988, pp. 41-44.
Cryogenics. Science Clarified. 2012. http://www.scienceclarified.com/Co-Di/Cryogenics.html.
Defrate, L. A. et al. (1959) "Optimum Design of Ejector Using Digital Computers" Chem. Eng. Prog. Symp. Ser., 55 ( 21) pp. 46.
Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.
Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Nanda, R. et al. (2007) "Utilizing Air Based Technologies as Heat Source for LNG Vaporization," presented at the 86th Annual convention of the *Gas Processors of America* (GPA 2007), Mar. 11-14, 2007, San Antonio, TX.
Rosetta, M. J. et al. (2006) "Integrating Ambient Air Vaporization Technology with Waste Heat Recovery—A Fresh Approach to LNG Vaporization," presented at the 85th annual convention of the *Gas Processors of America* (GPA 2006), Grapevine, Texas, Mar. 5-8, 2006.
U.S. Appl. No. 13/596,684, filed Aug. 28, 2012, Slobodyanskiy et al.

(56) References Cited

OTHER PUBLICATIONS

U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067,726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.
Ahmed, S. et al. (1998) "Catalytic Partial Oxidation Reforming of Hydrocarbon Fuels," *1998 Fuel Cell Seminar*, Nov. 16-19, 1998, 7 pgs.
Anderson, R. E. (2006) "Durability and Reliability Demonstration of a Near-Zero-Emission Gas-Fired Power Plant," *California Energy Comm.*, CEC 500-2006-074, 80 pgs.
Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.
Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.
BP Press Release (2006) "BP and Edison Mission Group Plan Major Hydrogen Power Project for California," Feburary 10, 2006, www.bp.com/hydrogenpower, 2 pgs.
Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.
Clark, Hal (2002) "Development of a Unique Gas Generator for a Non-Polluting Power Plant," *California Energy Commission Feasibility Analysis*, P500-02-011F, Mar. 2002, 42 pgs.
Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.
Elwell, L. C. et al. (2005) "Technical Overview of Carbon Dioxide Capture Technologies for Coal-Fired Power Plants," *MPR Associates, Inc.*, Jun. 22, 2005, 15 pgs.
Ertesvag, I. S. et al. (2005) "Exergy Analysis of a Gas-Turbin Combined-Cycle Power Plant With Precombustion $CO_2$ Capture," Elsivier, 2004, pp. 5-39.
Luby, P. et al. (2003) "Zero Carbon Power Generation: IGCC as the Premium Option," *Powergen International*, 19 pgs.
MacAdam, S. et al. (2008) "Coal-Based Oxy-Fuel System Evaluation and Combustor Development," *Clean Energy Systems, Inc.* 6 pgs.
Morehead, H. (2007) "Siemens Global Gasification and IGCC Update," *Siemens, Coal-Gen*, Aug. 3, 2007, 17 pgs.
Reeves, S. R. (2001) "Geological Sequestration of $CO_2$ in Deep, Unmineable Coalbeds: An Integrated Research and Commercial-Scale Field Demonstration Project," *SPE 71749*, 10 pgs.
Reeves, S. R. (2003) "Enhanced Coalbed Methane Recovery," *SPE 101466-DL*, 8 pgs.
Richards, G. A. et al. (2001) "Advanced Steam Generators," *National Energy Technology Laboratory*, 7 pgs.
Snarheim, D. et al. (2006) "Control Design for a Gas Turbine Cycle With $CO_2$ Capture Capabilities," *Modeling, Identification and Control*, vol. 00, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.
vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.
Zhu, J. et al. (2002) "Recovery of Coalbed Methane by Gas Injection," *SPE 75255*, 15 pgs.

\* cited by examiner

STOICHIOMETRIC COMBUSTION OF ENRICHED AIR WITH EXHAUST GAS RECIRCULATION

CROSS-REFERENCE TO RELATED APPLICATIONS

This application is the National Stage entry under 35 U.S.C. 371 of PCT/US2011/039829, that published as WO 2012/003079 and was filed on 9 Jun. 2011 which claims the benefit of U.S. Provisional Application No. 61/361,178, filed on 2 Jul. 2010, each of which is incorporated by reference, in its entirety, for all purposes.

This application contains subject matter related to PCT/US2011/042870, that published as WO 2012/003489 and was filed on 1 Jul. 2011; PCT/US2011/039824, that published as WO 2012/003076 and was filed on 9 Jun. 2011; PCT/US2011/039826, that published as WO 2012/003077 and was filed on 9 Jun. 2011; PCT/US2011/039828, that published as WO 2012/003078 and was filed on 9 Jun. 2011; and PCT/US2011/039830, that published as WO 2012/003080 and was filed on 9 Jun. 2011.

This application contains subject matter related to U.S. Patent Application No. 61/361,169, filed Jul. 2, 2010 entitled "Systems and Methods for Controlling Combustion of a Fuel"; U.S. Patent Application No. 61/361,170, filed Jul. 2, 2010 entitled "Low Emission Triple-Cycle Power Generation Systems and Methods"; U.S. Patent Application No. 61/361,173, filed Jul. 2, 2010, entitled "Low Emission Triple-Cycle Power Generation Systems and Methods"; U.S. Patent Application No. 61/361,176, filed Jul. 2, 2010, entitled "Stoichiometric Combustion With Exhaust Gas Recirculation and Direct Contact Cooler"; U.S. Patent Application No. 61/361,180 filed Jul. 2, 2010, entitled "Low Emission Power Generation Systems and Methods".

FIELD

Embodiments of the disclosure relate to low emission power generation in combined-cycle power systems. More particularly, embodiments of the disclosure relate to methods and apparatus for combusting a fuel for enhanced carbon dioxide ($CO_2$) manufacture and capture.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

With the growing concern on global climate change and the impact of $CO_2$ emissions, emphasis has been placed on $CO_2$ capture from power plants. This concern combined with the implementation of cap-and-trade policies in many countries make reducing $CO_2$ emissions a priority for these and other countries as well as the companies that operate hydrocarbon production systems therein.

Gas turbine combined-cycle power plants are rather efficient and can be operated at relatively low cost when compared to other technologies, such as coal and nuclear. Capturing $CO_2$ from the exhaust of gas turbine combined-cycle plants, however, can be difficult for several reasons. For instance, there is typically a low concentration of $CO_2$ in the exhaust compared to the large volume of gas that must be treated. Also, additional cooling is often required before introducing the exhaust to a $CO_2$ capture system and the exhaust can become saturated with water after cooling, thereby increasing the reboiler duty in the $CO_2$ capture system. Other common factors can include the low pressure and large quantities of oxygen frequently contained in the exhaust. All of these factors result in a high cost of $CO_2$ capture from gas turbine combined-cycle power plants.

At least one approach to lowering $CO_2$ emissions in combined-cycle systems includes stoichiometric combustion and exhaust gas recirculation. In a conventional exhaust gas recirculation system, such as a natural gas combined cycle (NGCC), a recycled component of the exhaust gas is mixed with ambient air and introduced into the compressor section of a gas turbine. Typical $CO_2$ concentrations in the exhaust of a NGCC are around 3%-4%, but can increase above 4% with exhaust recirculation. In operation, conventional NGCC systems require only about 40% of the air intake volume to provide adequate stoichiometric combustion of the fuel, while the remaining 60% of the air volume serves as a diluent to moderate the temperature and cool the exhaust to a temperature suitable for introduction into the succeeding expander. Recirculating a portion of the exhaust gas increases the $CO_2$ concentration in the exhaust, which can subsequently be used as the diluent in the combustion system.

However, due to the molecular weight, specific heat, Mach number effects, etc. of $CO_2$, without significant modifications to either the compressor or the expander sections, standard gas turbines are limited as to the concentration of $CO_2$ that can be tolerated in the compression section of the gas turbine from the exhaust. For example, the limit on $CO_2$ content in the exhaust recirculated to the compression section of a standard gas turbine is about 20 wt % $CO_2$.

Moreover, the typical NGCC system produces low pressure exhaust which requires a fraction of the power produced via expansion of the exhaust in order to extract the $CO_2$ for sequestration or enhanced oil recovery (EOR), thereby reducing the thermal efficiency of the NGCC. Further, the equipment for the $CO_2$ extraction is large and expensive, and several stages of compression are required to take the ambient pressure gas to the pressure required for EOR or sequestration. Such limitations are typical of post-combustion carbon capture from low pressure exhaust associated with the combustion of other fossil fuels, such as coal.

The foregoing discussion of need in the art is intended to be representative rather than exhaustive. A technology addressing one or more such needs, or some other related shortcoming in the field, would benefit power generation in combined-cycle power systems.

SUMMARY

The present disclosure is directed to integrated systems and methods for improving power generation systems. In some implementations, the present disclosure provides a gas turbine system, comprising a first compressor, a second compressor, a combustion chamber, and an expander. The first compressor may be configured to receive and compress a recycled exhaust gas into a compressed recycle exhaust gas. The second compressor may be configured to receive and compress enriched air to generate a compressed oxidant. The combustion chamber may be configured to receive the compressed recycle exhaust gas and the compressed oxidant and to stoichiometrically combust a fuel stream. The compressed recycle exhaust gas serves as a diluent to moderate combustion temperatures. The expander may be configured to receive a discharge from the combustion chamber to generate the recycled exhaust gas. The expander further may be coupled to the first compressor to drive, at least partially, the first compressor.

Additionally or alternatively, the present disclosure provides methods of generating power. Exemplary methods include: a) compressing a recycled exhaust gas in a main compressor to generate a compressed recycle exhaust gas; b) compressing enriched air in an inlet compressor to generate a compressed oxidant; c) stoichiometrically combusting the compressed oxidant and a fuel in a combustion chamber and in the presence of the compressed recycle exhaust gas, thereby generating a discharge stream, wherein the compressed recycle exhaust gas acts as a diluent configured to moderate the temperature of the discharge stream; and d) expanding the discharge stream in an expander to at least partially drive the main compressor and generate the recycled exhaust gas and at least partially drive the main compressor.

Still additionally or alternatively, the present disclosure provides integrated power generation systems. Exemplary integrated power generation systems include both a gas turbine system and an exhaust gas recirculation system. The gas turbine system may comprise a first compressor, a second compressor, a combustion chamber, and an expander. The first compressor may be configured to receive and compress a recycled exhaust gas into a compressed recycle exhaust gas. The second compressor may be configured to receive and compress enriched air to generate a compressed oxidant, the enriched air having an oxygen concentration between about 30 wt % and about 50 wt %. The combustion chamber may be configured to receive the compressed recycle exhaust gas and the compressed oxidant and to stoichiometrically combust a fuel stream, wherein the compressed recycle exhaust gas serves as a diluent to moderate combustion temperatures. The expander may be configured to receive a discharge from the combustion chamber to generate the recycled exhaust stream. The expander further may be coupled to the first compressor and adapted to drive, at least partially, the first compressor. The exhaust gas recirculation system may include a heat recovery steam generator, one or more cooling units, and a boost compressor. The heat recovery steam generator may be communicably coupled to a steam gas turbine. The heat recovery steam generator may be being configured to receive the exhaust gas from the expander to create steam that generates electrical power in the steam generator. The one or more cooling units may be configured to cool the recycled exhaust gas received from the heat recovery steam generator and to remove condensed water from the recycled exhaust gas. The boost compressor may be configured to increase the pressure of the recycled exhaust gas before injection into the first compressor to provide the compressed recycle exhaust gas.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Figure 1:
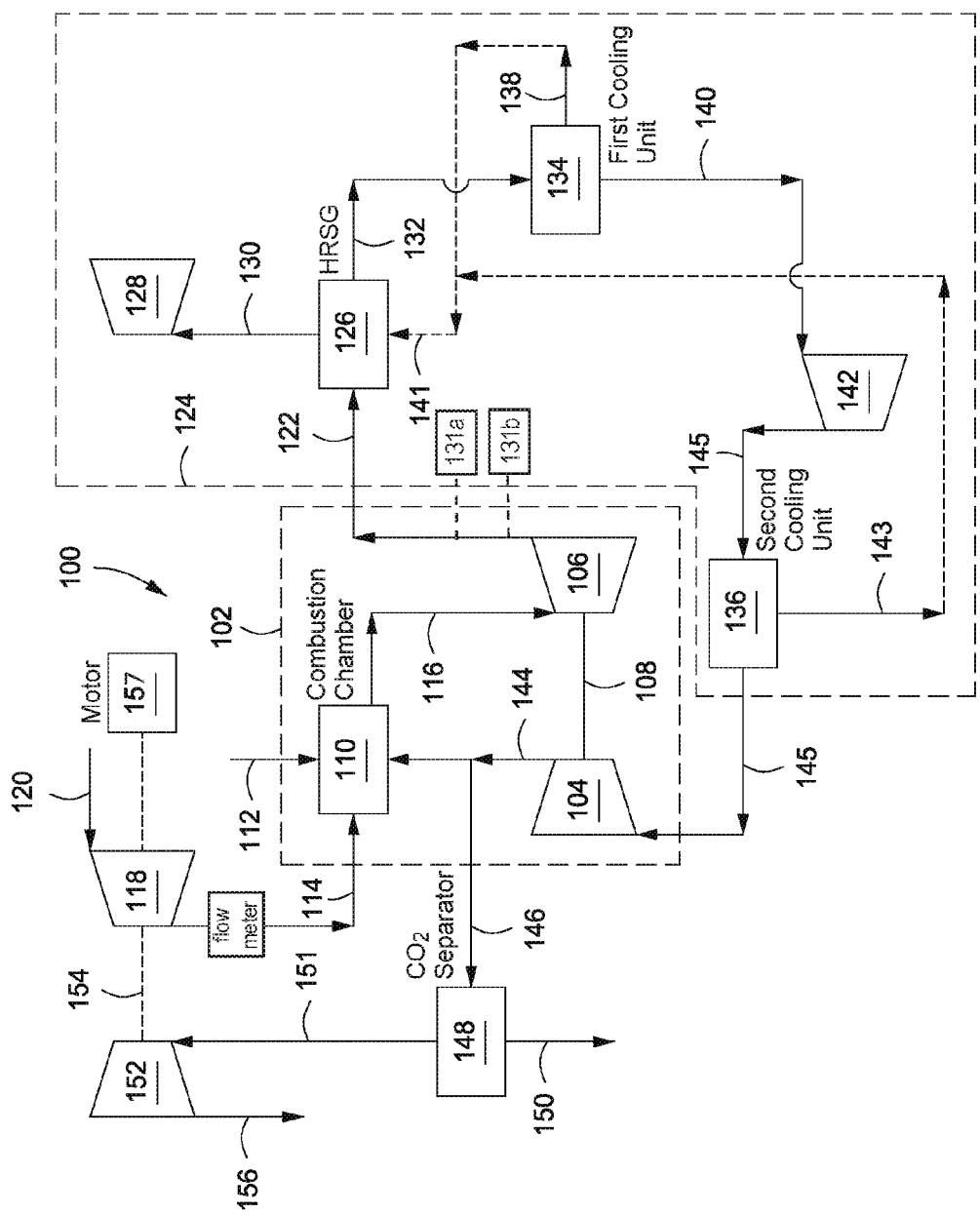
FIG. 1 depicts a schematic of an integrated system for low emission power generation and enhanced $CO_2$ recovery, according to one or more embodiments described.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide, carbon dioxide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having a molar ratio of combustion fuel to oxygen ranging from about plus or minus 10% of the oxygen required for a stoichiometric ratio or more preferably from about plus or minus 5% of the oxygen required for the stoichiometric ratio. For example, the stoichiometric ratio of fuel to oxygen for methane is 1:2 ($CH_4+2O_2>CO_2+2H_2O$). Propane will have a stoichiometric ratio of fuel to oxygen of 1:5. Another way of measuring substantially stoichiometric combustion is as a ratio of oxygen supplied to oxygen required for stoichiometric combustion, such as from about 0.9:1 to about 1.1:1, or more preferably from about 0.95:1 to about 1.05:1.

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes can be used to produce ultra low emission electric power and $CO_2$ for enhanced oil recovery (EOR) and/or sequestration applications. In one or more embodiments, a mixture of enriched air and fuel can be stoichiometrically or substantially stoichiometrically combusted and simultaneously mixed with a stream of recycled exhaust gas. The stream of recycled exhaust gas, generally including products of combustion such as $CO_2$, can be used as a diluent to control, adjust, or otherwise moderate the temperature of combustion and the exhaust that enters the succeeding expander. As a result of using enriched air, the recycled exhaust gas can have an increased $CO_2$ content, thereby allowing the expander to operate at even higher expansion ratios for the same inlet and discharge temperatures, thereby producing significantly increased power.

Combustion in commercial gas turbines at stoichiometric conditions or substantially stoichiometric conditions (e.g., "slightly rich" combustion) can prove advantageous in order to eliminate the cost of excess oxygen removal. By cooling the exhaust and condensing the water out of the cooled exhaust stream, a relatively high content $CO_2$ exhaust stream can be produced. While a portion of the recycled exhaust gas can be utilized for temperature moderation in the closed Brayton cycle, a remaining purge stream can be used for EOR applications and/or electric power can be produced with little or no sulfur oxides ($SO_X$), nitrogen oxides ($NO_X$), and/or $CO_2$ being emitted to the atmosphere. The result of this process is the production of power in three separate cycles and the manufacturing of additional $CO_2$.

Referring now to the figures, FIG. 1 depicts a schematic of an illustrative integrated system 100 for power generation and $CO_2$ recovery using a combined-cycle arrangement, according to one or more embodiments. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel introduced via line 112 and mixed with an oxidant introduced via line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof. The oxidant via line 114 can be derived from a second or inlet compressor 118 fluidly coupled to the combustion chamber 110 and adapted to compress a feed oxidant introduced via line 120. In one or more embodiments, the feed oxidant in line 120 can include atmospheric air, enriched air, or combinations thereof. When the oxidant in line 114 includes a mixture of atmospheric air and enriched air, the enriched air can be compressed by the inlet compressor 118 either before or after being mixed with the atmospheric air. The enriched air can have an overall oxygen concentration of about 30 wt %, about 35 wt %, about 40 wt %, about 45 wt %, or about 50 wt %.

The enriched air can be derived from several sources, including implementing various technologies upstream of the inlet compressor 118 to produce the enriched air. For example, the enriched air can be derived from such separation technologies as membrane separation, pressure swing adsorption, temperature swing adsorption, nitrogen plant-by-product streams, and/or combinations thereof. The enriched air can also be derived from an air separation unit (ASU), such as a cryogenic ASU, for producing nitrogen for pressure maintenance or other purposes. The reject stream from the ASU can be rich in oxygen, having an overall oxygen content of about 50 wt % to about 70 wt %. This reject stream can be used as at least a portion of the enriched air and subsequently diluted, if needed, with unprocessed atmospheric air to obtain the desired oxygen concentration for the application.

As will be described in more detail below, the combustion chamber 110 can also receive a compressed recycle exhaust gas in line 144, including an exhaust gas recirculation primarily having $CO_2$ and nitrogen components. The compressed recycle exhaust gas in line 144 can be derived from the main compressor 104 and adapted to help facilitate a stoichiometric or substantially stoichiometric combustion of the compressed oxidant in line 114 and fuel in line 112 by moderating the temperature of the combustion products. As can be appreciated, recirculating the exhaust gas can serve to increase the $CO_2$ concentration in the exhaust gas.

An exhaust gas in line 116 directed to the inlet of the expander 106 can be generated as a product of combustion of the fuel in line 112 and the compressed oxidant in line 114, in the presence of the compressed recycle exhaust gas in line 144. In at least one embodiment, the fuel in line 112 can be primarily natural gas, thereby generating a discharge or exhaust gas via line 116 that can include volumetric portions of vaporized water, $CO_2$, nitrogen, nitrogen oxides ($NO_X$), and sulfur oxides ($SO_X$). In some embodiments, a small portion of unburned fuel in line 112 or other compounds can also be present in the exhaust gas in line 116 due to combustion equilibrium limitations. As the exhaust gas in line 116 expands through the expander 106 it generates mechanical power to drive the main compressor 104, an electrical generator, or other facilities, and also produces a gaseous exhaust in line 122 having a heightened $CO_2$ content resulting from the influx of the compressed recycle exhaust gas in line 144. In some implementations the expander 106 may be adapted to produce additional mechanical power that may be used for other purposes.

The power generation system 100 can also include an exhaust gas recirculation (EGR) system 124. In one or more embodiments, the EGR system 124 can include a heat recovery steam generator (HRSG) 126, or similar device, fluidly coupled to a steam gas turbine 128. In at least one embodiment, the combination of the HRSG 126 and the steam gas turbine 128 can be characterized as a power-producing closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust in line 122 can be introduced to the HRSG 126 in order to generate steam via line 130 and a cooled exhaust gas in line 132. In one embodiment, the steam in line 130 can be sent to the steam gas turbine 128 to generate additional electrical power.

The cooled exhaust gas in line 132 can be sent to a first cooling unit 134 adapted to cool the cooled exhaust gas in line 132 and generate a cooled recycle gas stream 140. The first cooling unit 134 can include, for example, one or more contact coolers, trim coolers, evaporative cooling unit, or any combination thereof. The first cooling unit 134 can also be adapted to remove a portion of any condensed water from the cooled exhaust gas in line 132 via a water dropout stream 138. In at least one embodiment, the water dropout stream 138 may be routed to the HRSG 126 via line 141 to provide a water source for the generation of additional steam in line 130 therein. In other embodiments, the water recovered via the water dropout stream 138 can be used for other downstream applications, such as supplementary heat exchanging processes.

In one or more embodiments, the cooled recycle gas stream 140 can be directed to a boost compressor 142. Cooling the cooled exhaust gas in line 132 in the first cooling unit 134 can reduce the power required to compress the cooled recycle gas stream 140 in the boost compressor 142. As opposed to a conventional fan or blower system, the boost compressor 142 can be configured to compress and increase the overall density of the cooled recycle gas stream 140, thereby directing a pressurized recycle gas in line 145 downstream, where the pressurized recycle gas in line 145 has an increased mass flow rate for the same volumetric flow. This can prove advantageous since the main compressor 104 can be volume-flow limited, and directing more mass flow through the main compressor 104 can result in higher discharge pressures, thereby translating into higher pressure ratios across the expander 106. Higher pressure ratios generated across the expander 106 can allow for higher inlet temperatures and, therefore, an increase in expander 106 power and efficiency. As can be appreciated, this may prove advantageous since the $CO_2$-rich exhaust gas in line 116 generally maintains a higher specific heat capacity.

Since the suction pressure of the main compressor 104 is a function of its suction temperature, a cooler suction temperature will demand less power to operate the main compressor 104 for the same mass flow. Consequently, the pressurized recycle gas in line 145 can optionally be directed to a second cooling unit 136. The second cooling unit 136 can include, for example, one or more direct contact coolers, trim coolers, evaporative cooling units, or any combination thereof. In at least one embodiment, the second cooling unit 136 can serve as an aftercooler adapted to remove at least a portion of the heat of compression generated by the boost compressor 142 on the pressurized recycle gas in line 145. The second cooling unit 136 can also extract additional condensed water via a water dropout stream 143. In one or more embodiments, the water dropout streams 138, 143 can converge into stream 141 and may or may not be routed to the HRSG 126 to generate additional steam via line 130 therein.

While only first and second cooling units 134, 136 are depicted herein, it will be appreciated that any number of cooling units can be employed to suit a variety of applications, without departing from the scope of the disclosure. In fact, contemplated herein are embodiments where the cooled exhaust gas in line 132 is further directed to an evaporative cooling unit associated with the exhaust gas recirculation loop, such as generally described in the concurrently filed U.S. Patent Application entitled "Stoichiometric Combustion with Exhaust Gas Recirculation and Direct Contact Cooler," the contents of which are hereby incorporated by reference to the extent not inconsistent with the present disclosure. As described therein, the exhaust gas recirculation system may include any variety of equipment adapted to provide the exhaust gas to the main compressor for injection into the combustion chamber.

The main compressor 104 can be configured to receive and compress the pressurized recycle gas in line 145 to a pressure nominally at or above the pressure of the combustion chamber 110, thereby generating the compressed recycle exhaust gas in line 144. As can be appreciated, cooling the pressurized recycle gas in line 145 in the second cooling unit 136 after compression in the boost compressor 142 can allow for an increased volumetric mass flow of exhaust gas into the main compressor 104. Consequently, this can reduce the amount of power required to compress the pressurized recycle gas in line 145 to a predetermined pressure.

In at least one embodiment, a purge stream 146 can be recovered from the compressed recycle exhaust gas in line 144 and subsequently treated in a $CO_2$ separator 148 to capture $CO_2$ at an elevated pressure via line 150. The separated $CO_2$ in line 150 can be used for sales, used in another processes requiring $CO_2$, and/or further compressed and injected into a terrestrial reservoir for enhanced oil recovery (EOR), sequestration, or another purpose. Because of the stoichiometric or substantially stoichiometric combustion of the fuel in line 112 combined with a boosted pressure from the boost compressor 142, the $CO_2$ partial pressure in the purge stream 146 can be much higher than in conventional gas turbine exhausts. As a result, carbon capture in the $CO_2$ separator 148 can be undertaken using low-energy separation processes, such as employing less energy-intensive solvents. At least one suitable solvent is potassium carbonate ($K_2CO_3$) which absorbs $SO_X$ and/or $NO_X$, and converts them to useful compounds, such as potassium sulfite ($K_2SO_3$), potassium nitrate ($KNO_3$), and other simple fertilizers. Exemplary systems and methods of using potassium carbonate for $CO_2$ capture can be found in the concurrently filed U.S. Patent Application entitled "Low Emission Triple-Cycle Power Generation Systems and Methods," the contents of which are hereby incorporated by reference to the extent not inconsistent with the present disclosure.

A residual stream 151, essentially depleted of $CO_2$ and consisting primarily of nitrogen, can also be derived from the $CO_2$ separator 148. In one or more embodiments, the residual stream 151 can be introduced to a gas expander 152 to provide power and an expanded depressurized gas, or exhaust gas, via line 156. The expander 152 can be, for example, a power-producing nitrogen expander. As depicted, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. However, during start-up of the system 100 and/or during normal operation when the gas expander 152 is unable to supply all the required power to operate the inlet compressor 118, at least one motor 158, such as an electric motor, can be used synergistically with the gas expander 152. For instance, the motor 158 can be sensibly sized such that during normal operation of the system 100, the motor 158 can be configured to supply the power short-fall from the gas expander 152. In other embodiments, however, the gas expander 152 can be used to provide power to other applications, and not directly coupled to the inlet compressor 118. For example, there may be a substantial mismatch between the power generated by the expander 152 and the requirements of the compressor 118. In such cases, the expander 152 could be adapted to drive a smaller (or larger) compressor (not shown) that demands less (or more) power.

An expanded depressurized gas in line 156, primarily consisting of dry nitrogen gas, can be discharged from the gas expander 152. In at least one embodiment, the combination of the gas expander 152, inlet compressor 118, and $CO_2$ separator 148 can be characterized as an open Brayton cycle, or a third power-producing component of the power generation system 100. Illustrative systems and methods of expanding the nitrogen gas in the residual stream 151, and variations thereof, can be found in the concurrently filed U.S. Patent Application entitled "Low Emission Triple-Cycle Power Generation Systems and Methods," the contents of which are hereby incorporated by reference to the extent not inconsistent with the present disclosure.

Figure 2:
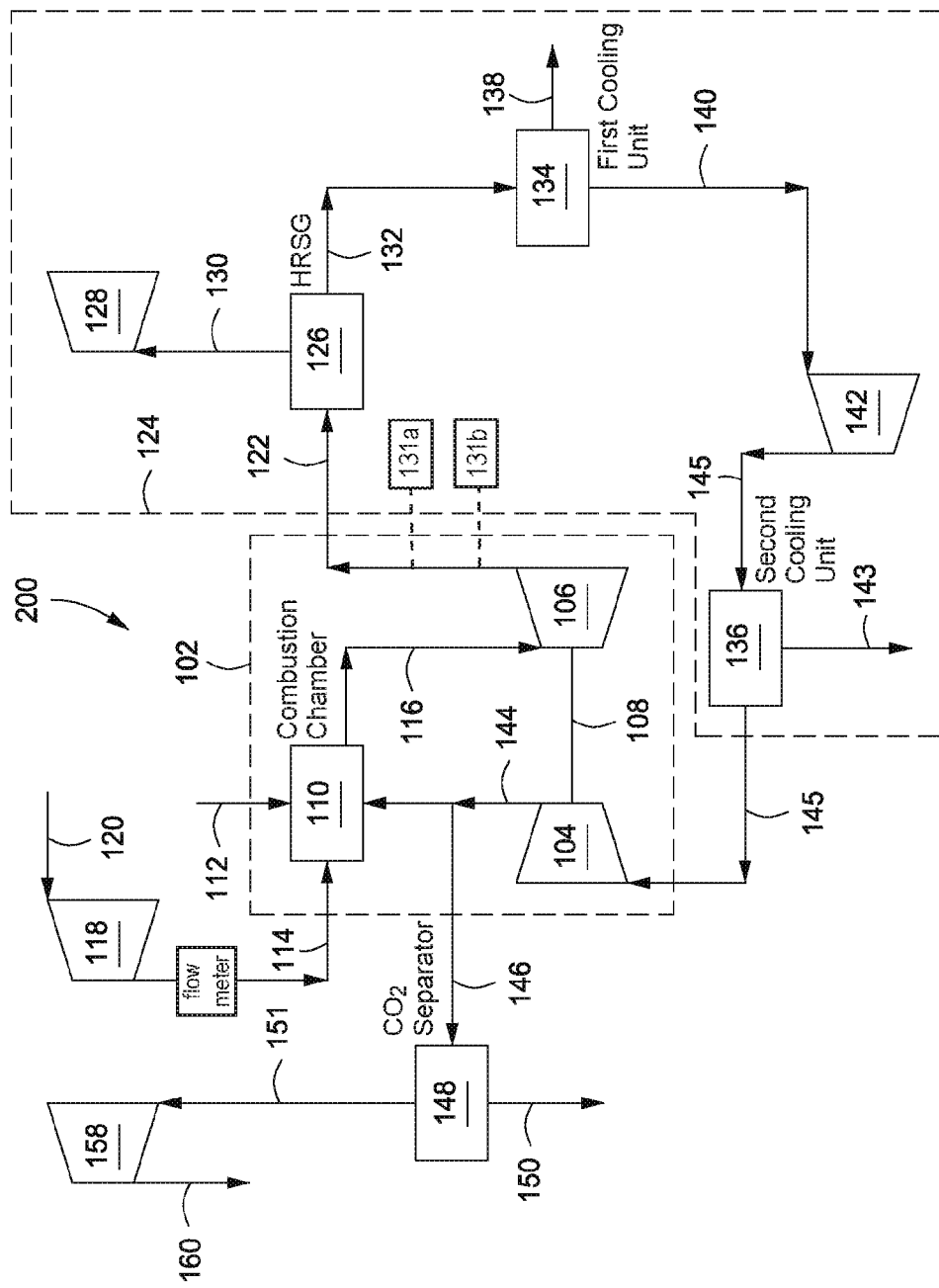
FIG. 2 depicts another schematic of an integrated system for low emission power generation and enhanced $CO_2$ recovery, according to one or more embodiments described.

Referring now to FIG. 2, depicted is another schematic of an illustrative integrated system 200 for power generation and $CO_2$ recovery using a combined-cycle arrangement, according to one or more embodiments. The system 200 of FIG. 2 is substantially similar to the system 100 of FIG. 1 and therefore will not be discussed in detail where like elements correspond to like numerals. The system 200 of FIG. 2, however, can replace the gas expander 152 of system 100 with a downstream compressor 158 configured to compress the residual stream 151 and generate a compressed exhaust gas via line 160. In one or more embodiments, the compressed exhaust gas in line 160 can be suitable for injection into a reservoir for pressure maintenance applications. In applications where methane gas is typically reinjected into hydrocarbon wells to maintain well pressures, compressing the residual stream 151 may prove advantageous. For example, the pressurized nitrogen gas in line 160 can instead be injected into the hydrocarbon wells and any residual methane gas can be sold or otherwise used as a fuel in related applications, such as providing fuel in line 112.

Figure 3:
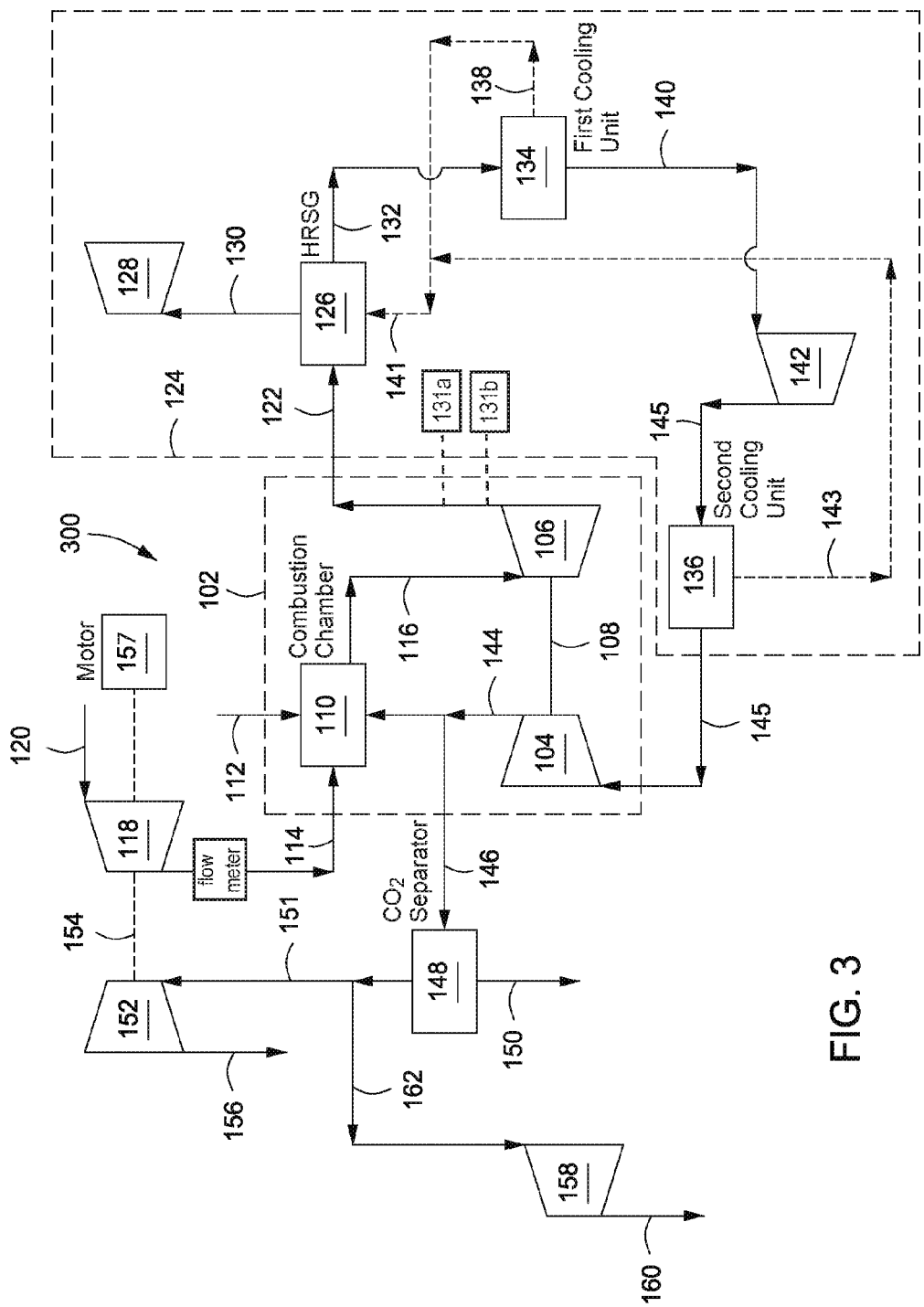
FIG. 3 depicts another schematic of an integrated system for low emission power generation and enhanced $CO_2$ recovery, according to one or more embodiments described.

Referring to FIG. 3, depicted is another schematic of an illustrative integrated system 300 for power generation and $CO_2$ recovery using a combined-cycle arrangement, according to one or more embodiments. The system 300 of FIG. 3 is substantially similar to the systems 100 and 200 of FIGS. 1 and 2, respectively, and therefore will not be discussed in detail where like elements correspond to like numerals. As depicted, the system 300 can be a characterized as a hybrid arrangement of the power-producing nitrogen gas expander 152 as discussed with reference to FIG. 1, and the pressure maintenance downstream compressor 158 as discussed with reference to FIG. 2. In one or more embodiments, the residual stream 151 can be split, thereby directing a first portion of the residual stream 151 to the gas expander 152, and at the same time directing a second portion of the residual stream 151 to the downstream compressor 158 via line 162. In at least one embodiment, the respective volumetric mass flow of the first and second portions can be manipulated so as to provide predetermined and/or desired amounts of the residual stream 151 to either location to maximize production.

By using enriched air as the compressed oxidant in line 114 and pressurizing the exhaust gas in the boost compressor 142, the power generation system 100 can achieve higher concentrations of $CO_2$ in the exhaust gas, thereby allowing for more effective $CO_2$ separation and capture. Embodiments disclosed herein can effectively increase the concentration of $CO_2$ in the exhaust gas in line 116 to $CO_2$ concentrations ranging from about 10 wt % to about 20 wt %. To achieve such $CO_2$ concentrations, the combustion chamber 110 can be adapted to stoichiometrically or substantially stoichiometrically combust an incoming mixture of fuel in line 112 and compressed oxidant in line 114, where the compressed oxidant in line 114 includes enriched air having an overall oxygen concentration of about 30 wt %, about 35 wt %, about 40 wt %, about 45 wt %, or about 50 wt %.

In order to moderate the temperature of the stoichiometric combustion and meet expander 106 inlet temperature and component cooling requirements, a portion of the exhaust gas with increased $CO_2$ content derived from the compressed recycle exhaust gas in line 144 can be injected into the combustion chamber 110 as a diluent. Thus, embodiments of the disclosure can essentially eliminate excess oxygen from the exhaust gas in line 116 while also increasing its $CO_2$ concentration to about 20 wt %. As such, the gaseous exhaust in line 122 can have less than about 3.0 wt % oxygen, or less than about 1.0 wt % oxygen, or less than about 0.1 wt % oxygen, or even less than about 0.001 wt % oxygen.

At least one benefit of having an increased $CO_2$ concentration is that the expander 106 can be operated at an even higher expansion ratio for the same inlet and discharge temperatures, and thereby produce increased power. This is due to the higher heat capacity of $CO_2$ relative to nitrogen found in ambient air. In one or more embodiments, the expansion ratio of the expander 106 can be increased from about 17.0 to about 20.0 corresponding to about 10 wt % and about 20 wt % $CO_2$ recycle streams, respectively. Embodiments using enriched air having about 35 wt % oxygen can be used in order to achieve the about 20 wt % in the $CO_2$ recycle stream.

Other benefits of having an increased $CO_2$ concentration in the recycle gas include an increased concentration of $CO_2$ in the extracted purge stream 146 used for $CO_2$ separation. Because of its increased $CO_2$ concentration, the purge stream 146 need not be as large in order to extract the required amounts of $CO_2$. For example, the equipment handling extraction for $CO_2$ separation can be smaller, including its piping, heat exchangers, valves, absorber towers, etc. Moreover, increased concentrations of $CO_2$ can improve the performance of $CO_2$ removal technology, including using low-energy separation processes, such as employing less energy-intensive solvents that would otherwise be untenable. Consequently, capital expenditures for capturing $CO_2$ can be dramatically lowered.

The specifics of exemplary operation of the system 100 will now be discussed. As will be appreciated, specific temperatures and pressures achieved or experienced in the various components of any of the embodiments disclosed herein can change depending on, among other factors, the purity of the oxidant used and/or the specific makes and/or models of expanders, compressors, coolers, etc. Accordingly, it will be appreciated that the particular data described herein is for illustrative purposes only and should not be construed as the only interpretation thereof. In an embodiment, the inlet compressor 118 can provide compressed oxidant in line 114 at pressures ranging between about 280 psia and about 300 psia. Also contemplated herein, however, is aeroderivative gas turbine technology, which can produce and consume pressures of up to about 750 psia and more.

The main compressor 104 can be configured to recycle and compress recycled exhaust gas into the compressed recycle exhaust gas in line 144 at a pressure nominally above or at the combustion chamber 110 pressure, and use a portion of that recycled exhaust gas as a diluent in the combustion chamber 110. Because amounts of diluent needed in the combustion chamber 110 can depend on the purity of the oxidant used for stoichiometric combustion or the particular model or design of expander 106, a ring of thermocouples and/or oxygen sensors 131a, 131b can be disposed on the outlet of the expander 106. In operation, the thermocouples and sensors 131a, 131b can be adapted to regulate and determine the volume of exhaust gas required as diluent needed to cool the products of combustion to the required expander inlet temperature, and also regulate the amount of oxidant being injected into the combustion chamber 110. Thus, in response to the heat requirements detected by the thermocouples 131a and the oxygen levels detected by the oxygen sensors 131b, the volumetric mass flow of compressed recycle exhaust gas in line 144 and compressed oxidant in line 114 can be manipulated or fluctuate to match the demand. Illustrative embodiments and more detailed descriptions of systems and methods for controlling the composition of an exhaust gas produced by combusting a fuel can be found in the concurrently filed U.S. patent application Ser. No. 13/808,073 entitled "Systems and Methods for Controlling Combustion of a Fuel," the contents of which are hereby incorporated by reference to the extent not inconsistent with the present disclosure.

In at least one embodiment, a pressure drop of about 12-13 psia can be experienced across the combustion chamber 110 during stoichiometric or substantially stoichiometric combustion. Combustion of the fuel in line 112 and the compressed oxidant in line 114 can generate temperatures between about 2000° F. and about 3000° F. and pressures ranging from 250 psia to about 300 psia. As described above, because of the increased mass flow and higher specific heat capacity of the $CO_2$-rich exhaust gas derived from the compressed recycle exhaust gas in line 144, higher pressure ratios can be achieved across the expander 106, thereby allowing for higher inlet temperatures and increased expander 106 power.

The gaseous exhaust in line 122 exiting the expander 106 can exhibit pressures at or near ambient. In at least one embodiment, the gaseous exhaust in line 122 can have a pressure of about 13-17 psia. The temperature of the gaseous exhaust in line 122 can be about 1225° F. to about 1275° F. before passing through the HRSG 126 to generate steam in line 130 and a cooled exhaust gas in line 132. In one or more embodiments, the cooling unit 134 can reduce the temperature of the cooled exhaust gas in line 132 thereby generating the cooled recycle gas stream 140 having a temperature between about 32° F. and about 120° F. As can be appreciated, such temperatures can fluctuate depending primarily on wet bulb temperatures during specific seasons in specific locations around the globe.

According to one or more embodiments, the boost compressor 142 can be configured to elevate the pressure of the cooled recycle gas stream 140 to a pressure ranging from about 17 psia to about 21 psia. As a result, the main compressor 104 eventually receives and compresses a recycled exhaust with a higher density and increased mass flow, thereby allowing for a substantially higher discharge pressure while maintaining the same or similar pressure ratio. In order to further increase the density and mass flow of the recycle exhaust gas, the pressurized recycle gas in line 145 discharged from the boost compressor 142 can then be further cooled in the second cooling unit 136. In one or more embodiments, the second cooling unit 136 can be configured to reduce the temperature of the pressurized recycle gas in line 145 to about 105° F. before being directed to the main compressor 104.

In at least one embodiment, the temperature of the compressed recycle exhaust gas in line 144 discharged from the main compressor 104, and consequently the temperature of the purge stream 146, can be about 800° F., with a pressure of around 280 psia. The addition of the boost compressor 142 and the stoichiometric combustion of enriched air can increase the $CO_2$ purge pressure in the purge stream 146, which can lead to improved solvent treating performance in the $CO_2$ separator 148 due to the higher $CO_2$ partial pressure.

Embodiments of the present disclosure can be further described with the following simulated example. Although the simulated example is directed to a specific embodiment, it is not to be viewed as limiting the disclosure in any specific respect.

To illustrate the superior performance of using enriched air as the compressed oxidant in line 114, the system 100 was simulated using standard air and then using enriched air having an oxygen concentration of about 35 wt % for the same gas turbine system 102 under the same ambient conditions. The following table provides these testing results and performance estimations.

TABLE 1

Triple - Cycle Performance Comparison

| Power (MW) | Cycle with Air | Cycle with Enriched Air |
|---|---|---|
| Gas Turbine Expander Power | 1234 | 1386 |
| Main Compressor | 511 | 561 |
| Fan or Boost Compressor | 18 | 20 |
| Inlet Compressor | 251 | 176 |
| Total Compression Power | 780 | 757 |
| Net Gas Turbine Power | 444 | 616 |
| Steam Turbine Net Power | 280 | 316 |
| Standard Machinery Net Power | 724 | 931 |
| Aux. Losses | 16 | 18 |
| Nitrogen Expander Power | 181 | 109 |
| Combined Cycle Power | 889 | 1022 |
| Combined Cycle Eff. (% lhv) | 55.6 | 56.4 |

As should be apparent from Table 1, embodiments including enriched air as the compressed oxidant in line 114 can result in an increase in expander 106 power, due to an increased expansion pressure ratio and an increased mass flow through the expander 106. Moreover, while the main compressor 104 may experience a slight increase in power demand, partially arising from the removal of a portion of the $N_2$ component from the air, the increase is more than offset by the reduced air compression power in the inlet compressor 118, thereby resulting in an overall decrease in the total compression power required. As can be appreciated, because of the reduced airflow for the same amount of oxygen, the inlet compressor 118 can exhibit a considerable decrease in required compressor power. Importantly, Table 1 indicates a large increase in the combined-cycle power output which reflects about 1.0% uplift in combined-cycle efficiency.

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. A gas turbine system, comprising:
    a first compressor configured to receive and compress only a recycled exhaust gas into a compressed recycle exhaust gas;
    a second compressor configured to receive and compress only enriched air having an oxygen concentration between 30 wt % and 50 wt % to generate a compressed oxidant;
    a combustion chamber configured to separately receive the compressed recycle exhaust gas and the compressed oxidant and substantially stoichiometrically combust a fuel stream to generate a discharge stream having a $CO_2$ concentration of between 15 wt % and 20 wt % and an oxygen concentration of less than 1 wt %, wherein the compressed recycle exhaust gas serves as a diluent to moderate combustion temperatures; and an expander coupled to the first compressor and configured to receive the discharge stream from the combustion chamber to generate the recycled exhaust gas and at least partially drive the first compressor;

wherein the fuel stream comprises a hydrocarbon fuel.

2. The system of claim 1, wherein the enriched air is derived from membrane separation, pressure swing adsorption, temperature swing adsorption, and any combination thereof.

3. The system of claim 1, wherein the enriched air is derived from a reject stream of an air separation unit.

4. The system of claim 3, wherein the reject stream has an oxygen concentration between 50 wt % and 70 wt %.

5. The system of claim 1, wherein the hydrocarbon fuel is selected from the group consisting of: natural gas, methane, naphtha, butane, propane, syngas, diesel, kerosene, aviation fuel, coal derived fuel, bio-fuel, oxygenated hydrocarbon feedstock, and any combination thereof.

6. The system of claim 1, further comprising a purge stream taken from the compressed recycle exhaust gas and treated in a $CO_2$ separator to generate a $CO_2$ stream and a residual stream comprising nitrogen gas.

7. A method of generating power, comprising:
compressing only a recycled exhaust gas in a main compressor to generate a compressed recycle exhaust gas;
compressing only enriched air having an oxygen concentration between 30 wt % and 50 wt % in an inlet compressor to generate a compressed oxidant;
separately injecting the compressed recycle exhaust gas and the compressed oxidant into a combustion chamber;
substantially stoichiometrically combusting the compressed oxidant and a hydrocarbon fuel in the combustion chamber and in the presence of the compressed recycle exhaust gas, thereby generating a discharge stream having a $CO_2$ concentration of between 15 wt % and 20 wt % and an oxygen concentration of less than 1 wt %, wherein the compressed recycle exhaust gas acts as a diluent configured to moderate the temperature of the discharge stream; and
expanding the discharge stream in an expander to at least partially drive the main compressor and generate the recycled exhaust gas.

8. The method of claim 7, wherein the enriched air is derived from a reject stream of an air separation unit, the reject stream having an oxygen concentration between 50 wt % and 70 wt %.

9. An integrated system, comprising:
a gas turbine system, comprising:
a first compressor configured to receive and compress only a recycled exhaust gas into a compressed recycle exhaust gas;
a second compressor configured to receive and compress only enriched air to generate a compressed oxidant, the enriched air having an oxygen concentration between 30 wt % and 50 wt %;
a combustion chamber configured to separately receive the compressed recycle exhaust gas and the compressed oxidant and stoichiometrically combust a fuel stream to generate a discharge stream having a $CO_2$ concentration of between 15 wt % and 20 wt % and an oxygen concentration of less than 1 wt %, wherein the compressed recycle exhaust gas serves as a diluent to moderate combustion temperatures;
an expander coupled to the first compressor and configured to receive the discharge stream from the combustion chamber to generate the recycled exhaust gas and at least partially drive the first compressor; and
an exhaust gas recirculation system, comprising:
a heat recovery steam generator communicably coupled to a steam gas turbine, the heat recovery steam generator being configured to receive the recycled exhaust gas from the expander to create steam that generates electrical power in the steam generator;
one or more cooling units configured to cool the recycled exhaust gas received from the heat recovery steam generator and remove condensed water from the recycled exhaust gas; and
a boost compressor configured to increase the pressure of the recycled exhaust gas before injection into the first compressor to provide the compressed recycle exhaust gas;
wherein the fuel stream comprises a hydrocarbon fuel.

10. The system of claim 9, wherein the boost compressor increases the pressure of the recycled exhaust gas stream to a pressure between 17 psia and 21 psia.

11. The system of claim 9, wherein the enriched air is mixed with atmospheric air to obtain the oxygen concentration between 30 wt % and 50 wt %.

12. The system of claim 9, wherein the enriched air is derived from membrane separation, pressure swing adsorption, temperature swing adsorption, an air separation unit, and any combination thereof.

13. The system of claim 12, wherein the air separation unit has a reject stream having an oxygen concentration between 50 wt % and 70 wt %, the reject stream providing at least a portion of the enriched air.

14. The system of claim 9, wherein the hydrocarbon fuel is selected from the group consisting of: natural gas, methane, naphtha, butane, propane, syngas, diesel, kerosene, aviation fuel, coal derived fuel, bio-fuel, oxygenated hydrocarbon feedstock, and any combination thereof.

* * * * *